United States Patent Office 3,331,070
Patented July 11, 1967

3,331,070
RADAR MOVING TARGET SIMULATOR
Donald J. Sommers, Brookline, N.H., and Thomas W. Thompson, Arlington, Mass., assignors to the United States of America as represented by the Secretary of the Air Force
Filed Jan. 12, 1966, Ser. No. 520,192
5 Claims. (Cl. 343—17.7)

ABSTRACT OF THE DISCLOSURE

A radar moving target simulator permitting an MTI radar to continue its search function during the operation of the moving target simulator by positioning an antenna remote from the MTI radar to intercept the beam from the MTI radar with means associated with the remote antenna to reflect back successive pulses to the MTI radar, with each of the reflected successive pulses being phase shifted in time a preselected magnitude.

---

This invention relates to a radar moving target simulator and more particularly to a system permitting the radar to continue its search function as the moving target is simulated.

Present methods of calibrating radars such as SAGE are by solar fix and the use of a permanent echo (PE). The former method is the one most extensively used. These methods of calibration have disadvantages. The major disadvantages are that the radar cannot continue its searching function while an azimuth check is being taken. This requires periodic fixes. If an error in azimuth calibration is present it will not be detected for some period of time. The solar fixes can be taken only when the sun is above the horizon (preferably near the horizon). Both solar fix and permanent echo require a human operator.

The present invention provides a permanent echo which appears as an apparent moving object when the main beam of the radar passes over the device. This is accomplished by a moving open circuit provided by a crystal microwave switch at the output of a remote stationary antenna. The optimum would be a 180° phase shift in time between each pulse. Since most radars have relatively narrow bandwidth this is easily provided by an additional quarter wavelength transmission line beyond the microwave switch. The switching occurs above a predetermined threshold such that only the main beam of the radar triggers this device. This return of this device is quite readily processed with radars equipped with MTI computer systems and the azimuth of the target produced by this device can automatically be checked against the known azimuth of the device.

The phase-shift mechanism consists of a microwave crystal switch located ¼ of a wavelength from an open circuit. The pulse from the radar will be reflected from the open circuit when the switch is "on" and by a virtual open circuit when the switch is "off." The phase difference between the resultant reflections is 180°. Since the SAGE radars all operate over relatively narrow bands (approximately 10%), the resultant simulated target motion will be nearly optimum regardless of operating frequency. The remaining portion of the circuit is a system to switch the bias of the crystal switch. A directional coupler between the crystal switch and antenna is provided to couple a portion of the reflected pulse to a video detector. The voltage level from the video detector is sensed by a Schmitt trigger, then differentiated and rectified to produce a negative-going trigger pulse at the trailing edge of the reflected pulse. This trigger pulse fires a multivibrator and the output of the multivibrator drives the crystal switch through a driver. The switching occurs just after the return pulse has left the crystal switch.

The moving target feature of the Echo can be used to accurately determine the azimuth position of the search radar. As the main beam of the radar approaches the azimuth orientation of the PE, the crystal switch is programmed to return alternate pulses with 180° phase difference. The threshold of the Schmitt trigger, as well as the gain of the system at the input to the video detector, is adjusted to a setting such that the 10-db points of the main beam starts the switch program. The switch will continue to alternate "off" and "on" until the other 10-db point intercepts the PE.

In case of the FPS–20 radar the 3-db-beamwidth is 1.5°, and the 10-db beamwidth is approximately 3°. The PRF for this radar is 360, and considering a 5 r.p.m. antenna scan speed, 36 pulses will be programmed by the PE if the 10-db threshold is used. This 36-pulse return will produce an equal number of output pulses from the MTI and will be quantized in the FST–2. The FST–2 can be used to split the target automatically.

The reason for a 10-db threshold is to stay sufficiently above side lobes (for example, 25-db for FPS-20) and to trigger on a steep part of the antenna pattern so that the number of programmed pulses will not change radically with a change in power level.

In the case of the FPS-6, there is no MTI. Thus a fixed target would be adequate. This could be produced with the same antenna as used for FPS-20 by inserting a low pass filter between the antenna and the moving target portion of the system. The S-band pulse for FPS-6 signal will be reflected by the LP filter while the L-band pulse for the FPS-20 will pass with virtually no loss. Thus, the addition of the LP filter extends the PE to a fixed target for calibration of the FPS-6. It is seen that the PE can be utilized for all SAGE radars for continuous azimuth and/or height calibration.

This invention has the advantage of providing a simulated moving target when the main beam of a radar passes over the device. Thus an azimuth calibration is provided on every sweep of radar. For radars equipped with a data processor as most SAGE radar, the azimuth calibration is easily integrated into the computer's program and the human operator is eliminated.

The antenna system accomplishes switching with the use of a microwave switch. These switches provided fast switching by electronic means at low controlling power over the microwave range. The phase shift per pulse could be provided with a ferrite phase shifter but higher switching powers would be needed. A ferrite phase shifter is also much slower acting. A phase shift could be provided by a continuously running mechanical microwave phase shifter. This is only practical at the higher frequencies where waveguide size is reduced such that high speed rotation of waveguide vanes or the like can be accomplished at low consumption of power.

An object of the present invention is to provide a radar moving target simulator wherein the radar continues its search function as the moving target is simulated.

Another object of the present invention is to provide a device producing a permanent echo which appears as an apparent moving object when the main beam of the radar passes thereover.

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1:
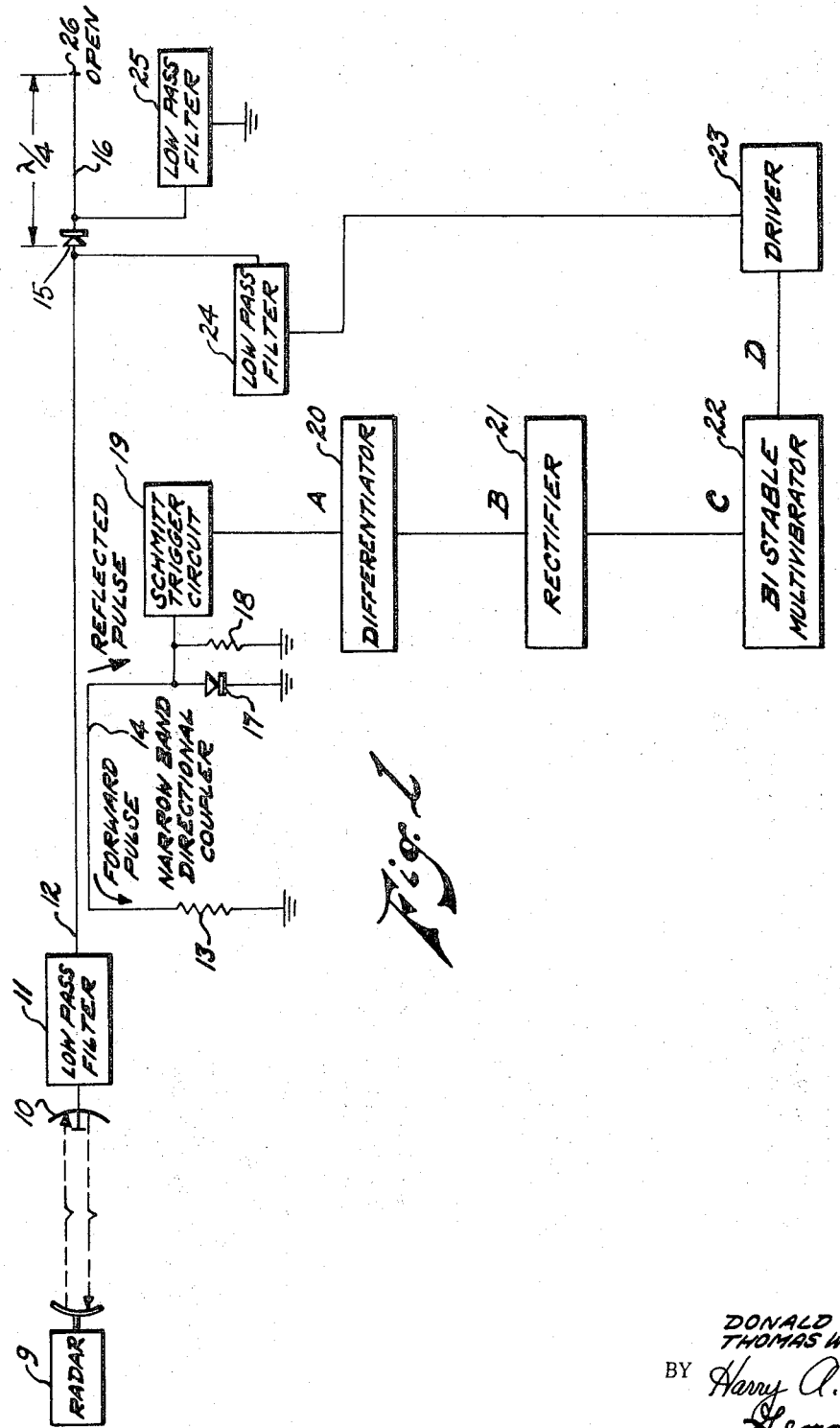
FIGURE 1 shows a preferred embodiment of the present invention.

Now referring in detail to FIGURE 1, there is shown antenna 10 which is located at a preselected stationary position at a predetermined distance from radar 9. A pulse from radar 9 is received by antenna 10 when the antenna intercepts the main beam thereof. The pulse passes through low pass filter 11 down coaxial transmission line 12. A small portion of this pulse is coupled to matched load 13 by directional coupler 14. Directional coupler 14 is shown in schematic form and is conventional such as shown and described at pages 834–839 of Principles of Radar, third Edition, by Reintjes and Coat, published in 1952 by McGraw-Hill Book Company, Inc.

Since only a small portion of the pulse is coupled to load 13, the remainder of the pulse travels down transmission line 12 towards microwave crystal switch 15 which may be an RF diode such as IN283.

Microwave crystal switch 15 is connected to coaxial transmission line 16 which is a quarter of a wavelength in length and has open circuit 26 at the end thereof.

Figure 2:
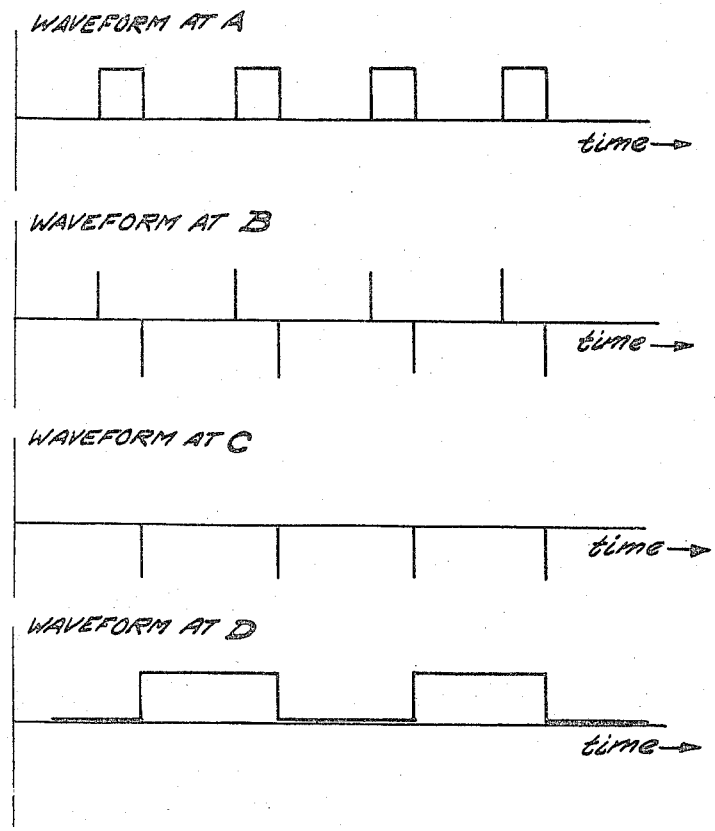
FIGURE 2 shows various waveforms associated with various components of FIGURE 1.

With microwave switch 15 biased off such that it appears as an open circuit at the switch, the remainder of the pulse is reflected by the open circuit presented by the switch. A small portion of the reflected pulse is coupled to a video detector consisting of diode 17 and resistor 18. The pulse is then applied to Schmitt trigger circuit 19. If this pulse is above a predetermined threshold, there will be a square pulse voltage out of the Schmitt trigger circuit 19 such as illustrated as waveform A of FIGURE 2. This squared wave output is passed through differentiator 20 to provide waveform B as illustrated in FIGURE 2. The differentiated signal is passed through rectifier 21 to provide waveform C as shown in FIGURE 2. The rectified signal is such that the trailing edge of the voltage pulse triggers bistable multivibrator 22. The output of multivibrator 22 is illustrated as waveform D of FIGURE 2 and is utilized to drive crystal switch 15 by way of driver 23 and low pass filter 24. Microwave crystal switch 15 is connected to ground by way of low pass filter 25 to provide a return path.

The output of driver 23 is used to switch crystal microwave switch 15 on so that it now appears as if the transmission line is continuous between the antenna and open circuit 26.

The next pulse from the radar will be reflected by the actual open circuit. Since the difference in distance traveled by each successive pulse is λ/2, the pulse returns appear as an optimum speed target on MTI. When the main beam is not illuminating antenna 10, the voltage out of the video detector will be below the threshold of Schmitt trigger circuit 19 and bistable multivibrator 22 will not be triggered. Thus microwave crystal switch 15 will appear either as an open or short circuit and the device will appear as a stationary antenna producing no output on the MTI.

Thus the present invention provides a simulated moving target by using the radar pulse to program an echo with optimum phase shift per pulse. This system would provide an MTI equipped radar with a method of continuous azimuth calibration based on the actual radiated beam of the radar.

It is to be noted that in the preferred embodiment of the invention the transmission line from antenna 10 to open circuit 26 is described as coaxial. However, the system would operate equally well if waveguide or strip line transmission lines were utilized.

What we claim is:

1. A radar moving target simulator permitting an MTI radar to continue its search function during the operation of the moving target simulator comprising a stationary antenna remote from said radar, said antenna intercepting the rotating main beam of said radar to receive successive pulses therefrom, and means to reflect back said radar successive pulses, said means to reflect back including means to phase shift each of said reflected successive pulses in time one hundred eighty degrees from the preceding one.

2. A radar moving target simulator permitting an MTI radar to continue its search function during the operation of the moving target simulator as described in claim 1 wherein means to reflect back said radar successive pulses, each of said reflected successive pulse being shifted 180° from the preceding one is comprised of a transmission line being open circuited at one end thereof and at the other end being connected to said antenna, and switching means located in series with said transmission line and positioned one quarter of a wavelength from said open circuit, said switching means being alternately open and closed upon the receipt of each of said succesive pulses.

3. A moving target simulator permitting an MTI radar to continue its search function during the operation of the moving target simulator as described in claim 1 wherein means to reflect back successive pulses, each of said reflected pulses being shifted 180° from the preceding one is comprised of a primary transmission line connected to said antenna, a quarter wave transmission line having one end thereof open circuited switching means interconnecting said primary transmission line and said quarter wave transmission line, said switching means being normally open, and means to close said switch during each alternate pulse of said successive pulses.

4. A radar target simulator permitting an MTI radar to continue its search function during the operation of the moving target simulator as described in claim 1 wherein the means to reflect back to said radar successive pulses, each of said reflected pulses being shifted in phase 180° from the preceding one being comprised of a primary transmission line connected to said antenna, a quarter wave transmission line open circuited at one end thereof, a microwave crystal diode interconnecting said primary transmission line and said quarter wave transmission line, said diode operating as a switch and being normally in the open position to reflect back the first of said successive pulses, a directional coupler associated with said primary transmission, said coupler having two ends, a resistive load connecting one of said ends of said coupler to ground, a video detector connecting the other of said ends of said coupler to ground, said coupler transferring a portion of each of said successive received pulse to said load and a portion of each reflected pulses to said video detector, a Schmitt circuit being triggered at a predetermined threshold by utilizing the signal output from said video detector, said Schmitt circuit providing a square pulse output of predetermined width, means to differentiate and rectify said square pulse output to provide a pulse representative of the trailing edge thereof, and a bistable multivibrator being triggered by said representative pulse to provide a pulse output to switch said diode to the closed position for a preselected time thus providing a continuous electrical path from said antenna to said open circuit of said quarter wave transmission line.

5. A radar moving target simulator permitting the radar to continue its search function during the operation of the radar moving target simulator comprising a stationary antenna located at a preselected position remote from said radar, said antenna intercepting the main beam of said radar thereby receiving successive pulses therefrom, a microwave switch, having two ends, said switch being normally in the off position, a first microwave transmission line interconnecting said antenna and one end of said switch, said successive pulses traveling forwardly along said transmission line toward said switch to be reflected therefrom when said switch is in its off or open position, a quarter wave transmission line connected to the other end of said switch, said quarter wave transmission line being open circuited, a directional coupler associated with said first microwave transmission line, said coupler having two ends, a resistive load connecting one of said ends of said coupler to ground, a video detector connecting the other of said ends of said coupler to ground, said coupler transferring a portion of each of said forwardly traveling successive pulses to said load, and a portion of said reflected pulses to said video detector, a Schmitt trigger circuit said Schmitt trigger circuit providing a square pulse output upon the receipt of a signal of a predetermined magnitude from said video detector, means to differentiate said square pulse output, means to rectify said differentiated signal to provide a signal having a trailing edge, a bistable multivibrator receiving the output signal from said rectifier and providing a pulse output therefrom to close said switch to permit the next successive forward pulse to be reflected from said open circuit.

References Cited
UNITED STATES PATENTS 2,557,979   6/1951   Labin.
2,572,088   10/1951   Young et al.

RODNEY D. BENNETT, *Primary Examiner.*

T. H. TUBBESING, *Assistant Examiner.*